United States Patent [19]

Baumgärtner et al.

[11] 3,727,026
[45] Apr. 10, 1973

[54] METHOD OF OPERATING AN ELECTRON-BEAM APPARATUS AND ELECTRON-BEAM SYSTEM

[75] Inventors: Siegfried Baumgärtner, Sixnitgern; Wolfgang Lippacher, Munich, both of Germany

[73] Assignee: Krauss-Mafei Aktiengesellschaft, Munich, Germany

[22] Filed: Feb. 22, 1971

[21] Appl. No.: 117,675

[30] Foreign Application Priority Data

Feb. 24, 1970 Germany..................P 20 08 387.8

[52] U.S. Cl. .........................219/121 EM, 250/108 R
[51] Int. Cl. ............................................B23k 15/00
[58] Field of Search ...............219/121 EB, 121 EM, 219/72; 250/108 R

[56] References Cited

UNITED STATES PATENTS

| | | | |
|---|---|---|---|
| 2,746,420 | 5/1956 | Steigerwald | 118/8 |
| 3,020,389 | 2/1962 | Gordon | 219/72 |
| 3,020,387 | 2/1962 | Basche et al. | 219/50 |
| 3,430,029 | 2/1969 | Hinrichs | 219/72 X |

Primary Examiner—J. V. Truhe
Assistant Examiner—Gale R. Peterson
Attorney—Karl F. Ross

[57] ABSTRACT

An electron-beam apparatus, for example, for the electron-beam welding of metal or other workpieces comprises an evacuatable chamber and a duct connecting this chamber with a suction source, e.g. a vacuum pump. To prevent the passage of secondary emissions, e.g. X-rays, through this duct, the invention provides a plurality of baffle members in spaced relation along the duct and swingable into a position generally parallel to the duct axis during evacuation of the chamber to prevent obstruction of the fluid flow thereto. Subsequent to evacuation and during electron-beam welding, however, the baffles, shutters or shielding members extend transversely to the axis to intercept the X-rays.

10 Claims, 7 Drawing Figures

PATENTED APR 10 1973 3,727,026

Siegfried Baumgärtner
Wolfgang Lippacher
INVENTORS.

BY
Karl F. Ross
Attorney

INVENTORS:
Siegfried Baumgärtner
Wolfgang Lippacher
BY
Karl G. Ross
Attorney

Siegfried Baumgärtner
Wolfgang Lippacher
INVENTORS.

BY

Karl F. Ross
Attorney

METHOD OF OPERATING AN ELECTRON-BEAM APPARATUS AND ELECTRON-BEAM SYSTEM

FIELD OF THE INVENTION

Our present invention relates to an electron-beam apparatus, especially an electron-beam welding system and, more particularly, to a method of operating such an apparatus and a system for preventing the passage of X-rays through the suction duct thereof.

BACKGROUND OF THE INVENTION

In an electron-beam apparatus, e.g. an electron-beam welding system, an evacuated chamber is generally provided to receive the target which may be a member of plurality of members to be welded together along a junction, interface or joint by an electron beam trained thereon.

The electron beam derives from an electron gun disposed on one side of the chamber and comprising, for example, a source of electrons such as a heated thermoemissive cathode or an ionizable gas, and one or more accelerating electrodes in an electric circuit with the cathode for applying an accelerating electric potential in the direction of propagation of the beam. In addition, electrodes or magnetic devices may be provided for controlling the intensity of the beam, confining and focusing the latter.

The electron-beam chamber is connected by a duct to a suction source, e.g. a vacuum pump, which may be required to develop reduced pressures of exceptionally low levels, e.g. $10^{-4}$ Torr. In fact, this duct should have a relatively large cross section to prevent the duct from limiting the rate and degree of evacuation.

It is well known that electron beams, especially of higher energy, generate secondary emissions in the form of X-rays when impinging upon a metal target. Such X-rays constitute a danger to operating personnel and measures must be taken to prevent escape from the apparatus and, at least, to limit the energy of any secondary emissions from the apparatus. In the commonly assigned copending application Ser. No. 117,329, filed Feb. 22, 1971 and entitled ELECTRON-BEAM CHAMBER, there is described a chamber structure which obviates this difficulty as far as the chamber proper is concerned. As pointed out in that application, the chamber walls may be lined with a material such as lead having a high capture cross section to the secondary emission thereby absorbing the X-ray radiation or reducing the energy of any X-rays which may penetrate the walls of the chamber.

However, the principles which are there applied to shielding of the electron-beam chamber with lead plates, lead walls or lead linings, cannot be used to prevent X-ray radiation from passing along the suction duct or any other duct which may be connected with this chamber. On the one hand, measures which prevent the passage of X-rays through the duct must be limited to prevent obstruction thereof while, on the other hand, a large cross-section duct, admitting massive passage of straight-line X-rays, is desirable if high evacuation efficiencies are to be obtained.

It has been proposed to limit the ability of X-rays, which generally travel in straight lines, to pass through the suction duct, by providing baffles along the length of the duct. Such baffles are provided in accordance with the principle that the impingement on each baffle of the X-ray results in complete absorption, in the passage of X-ray radiation of lower intensity to the next baffle, or in further orders of emission. If the processes are considered in terms of re-emission, therefore, the X-ray emission from the chamber gives rise to a secondary emission at the first baffle, a tertiary emission at the next baffle and so on. In practice, three baffles or shields, consisting of a structural metal lined with lead, have been found to be sufficient to reduce the energy level of the X-rays to a value which is not dangerous to operating personnel. However, since baffles spaced along the duct obstruct the cross section thereof and interfere with evacuation efficiency, this expedient has not found widespread acceptance.

In other prior-art systems, making use of the principle that X-ray propagation is rectilinear, the duct is bent in a number (generally at least four) right-angle turns or U bends. This system reduces the passage of X-ray to a minimum but has the disadvantage that it reduces evacuation efficiency as well. In fact, if the duct has a diameter of 300 mm, a value which is common in electron-beam chambers for welding purposes, and the chamber is to be evacuated $10^{-4}$ Torr, the aforementioned systems for preventing X-ray passage through the duct reduce the evacuation efficiency to 50 percent of that of the rectilinear duct free from the baffles or bends. Consequently, the suction capacity of the pump must be doubled if a given rate of evacuation of the chamber is to result

OBJECTS OF THE INVENTION

It is, therefore, the principal object of the present invention to provide an improved electron-beam apparatus and system whereby the aforementioned disadvantages are obviated.

It is another object of the invention to provide an improved method of operating an electron-beam apparatus to minimize the passage of X-rays therethrough and yet permit high-efficiency evacuation with a low-capacity pump.

Still another object of this invention is to provide a method of operating an electron-beam welding system to avoid the aforementioned disadvantages.

Still another object of the invention is the provision of an improved conduit or duct system for an electron-beam chamber.

SUMMARY OF THE INVENTION

These objects and others which will become apparent hereinafter are attained, in accordance with the present invention, with an electron-beam system comprising an evacuable chamber adapted to be traversed by an electron beam, i.e., provided with an electron gun, and a duct communicating with this chamber and provided with a plurality (preferably at least three) baffles in staggered relation partially obstructing the X-ray path cross section through the duct and serving to intercept X-rays entering same.

According to the principles of this invention, the baffles or shutters are shiftable from a position in which they lie generally transversely to the duct axis into a position in which they extend generally parallel thereto, actuating means being operable externally of the duct for shifting the baffles. We have found that the baffles may be shifted into this second position to provide a substantially unobstructed flow cross section during evacuation of the chamber since X-rays are not produced during this period. However, even though the section source may be operated during electron-beam passage through the chamber subsequently to the general evacuation, the return of the baffles to a transverse position prevents X-ray passage but nevertheless allows continued removal of air as may be required to maintain the desired degree of vacuum.

According to the principles of the present invention, therefore, the method comprises interposing radiation-shielding means in the path of the X-rays traversing the duct during use of the electron beam and, consequently, emission of X-rays by the electron beam, and shifting the shutter members out of the flow cross section of the duct during evacuation when no X-rays are produced and the electron beam is inoperative.

The method of the present invention is based upon the hitherto overlooked principle that antiradiation methods are unnecessary when the electron beam is not in use and the electron beam is not used until a satisfactory degree of vacuum has been attained. In the period necessary to build up the desired degree of vacuum the suction duct can remain free from the shielding means without the danger that radiation will traverse the suction duct and the vacuum pump. With the system of the present invention, therefore, movable baffles are provided which can be shifted out of the way during evacuation to leave an unobstructed duct which, therefore, need not be curved or bent.

According to a further feature of this invention, the suction duct or conduit is rectilinear, i.e., has an axis extending in the direction of fluid flow which is linear and unbent, while the X-ray intercepting means are flat shutters conforming in part to the transverse cross section of the duct but leaving a portion thereof unobstructed even in positions of the baffle members transverse to this axis. The baffles are axially spaced apart and, in an erect condition, extend alternately from opposite sides of the duct to terminate short of the opposing side and thereby leaving a gap through which suction may continue to be applied to the electron-beam chamber. The planar baffles are mounted in the duct so as to be swingable or tiltable from their erect positions to recumbent or prone positions with respect to the axis to permit the original evacuation of the electron-beam chamber.

Advantageously, the baffles may be provided with pivots which are parallel to one another and perpendicular to the axis of the duct and to the direction of flow of fluid therethrough. In one embodiment of the invention, the hinge or pivot is provided adjacent an outer edge of the baffle and the latter may be mounted in an enlarged portion of the duct so as to be received flush with the wall of the duct when swung from its erect position into its recumbent position. In another embodiment of the invention, the pivot is provided at an intermediate location along the baffle so that, in its recumbent position, the baffle lies in the center of the duct but parallel to the direction of fluid flow upon evacuation so as to be obstructing this process. The periphery of the disk may correspond to the transverse cross section of the duct whereby the edge of each baffle snugly fills the portion of the duct obstructed thereby when the baffles are in their erect position. It will be apparent from the foregoing that the pivotal baffles may be constituted in a manner similar to dampers in fluid-control arrangements or the shutters or like control elements of cameras and the like. It has already been mentioned that the duct may be provided with recesses in which the baffles are received in the open position of the latter. Substantially 100 percent of theoretical throughput is thus gained when the baffles are in their open position since the flow cross section remains practically unvaried by the presence of the baffles.

While the arrangement in which the baffles are received in recesses in the wall of the duct in advantageous because the throughput efficiency is closed to unity, the system in which the pivot means is provided at an intermediate location along the baffle has the advantage that the duct need not be modified and thereby can be of low cost. Furthermore, the latter system has the advantage that the pivots are coplanar and can be readily actuated externally of the apparatus. Hence each of the pivots may be connected with a lever, the lever being in turn articulated to a common displacement or link member which may be operated by a pneumatic or other fluid-responsive cylinder or by electrical means.

In accordance with another feature of this invention, the baffles in their open position in part overlap in the axial direction. In other words, the transverse height of the erect baffles should be greater than the spacing between the respective pivots. This provides a most efficient reduction of X-ray transmission with a minimum of air resistance and also enables the baffle arrangement to occupy a relative small length of the duct. We have found it to be advantageous to provide for each of the baffles abutment means or shoulders in the duct for engatement when the baffles are brought into their erect position. The shoulders, which sealingly and permanently are provided along the inner wall of the duct, do not materially interfere with air throughput but, upon engagement by the baffles, guarantee interception of X-rays which might otherwise traverse a gap between the periphery of the baffle and the wall of the duct. The duct and the baffles may be composed of lead or may be lined with lead or some other material of a high capture cross section to X-ray radiation.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
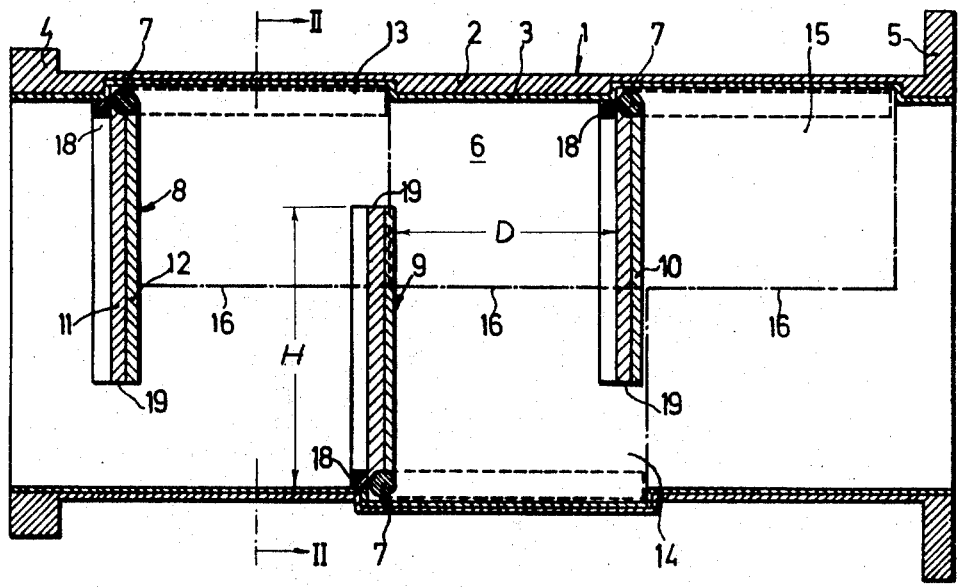
FIG. 1 is an axial cross section through a duct connecting an electron-beam chamber with the suction source.
Figure 3:
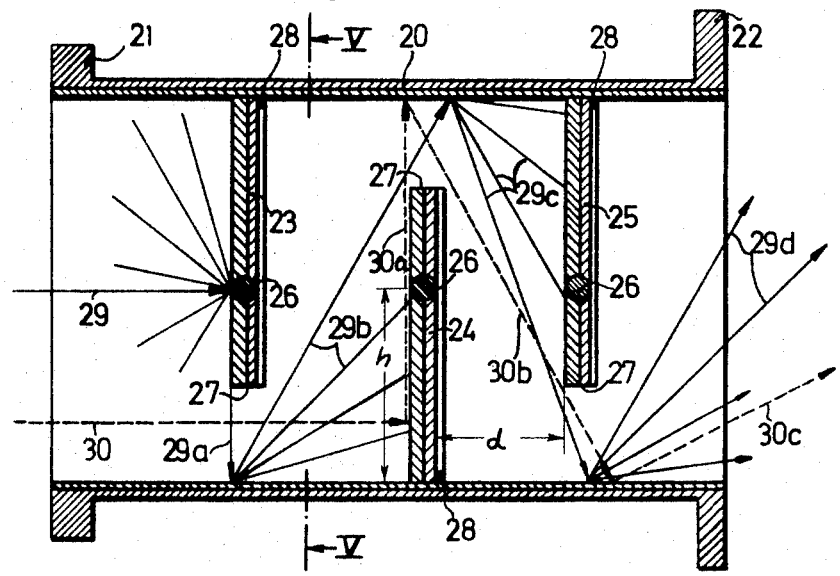
FIG. 3 is a view similar to FIG. 1 but illustrating another embodiment.
Figure 6:
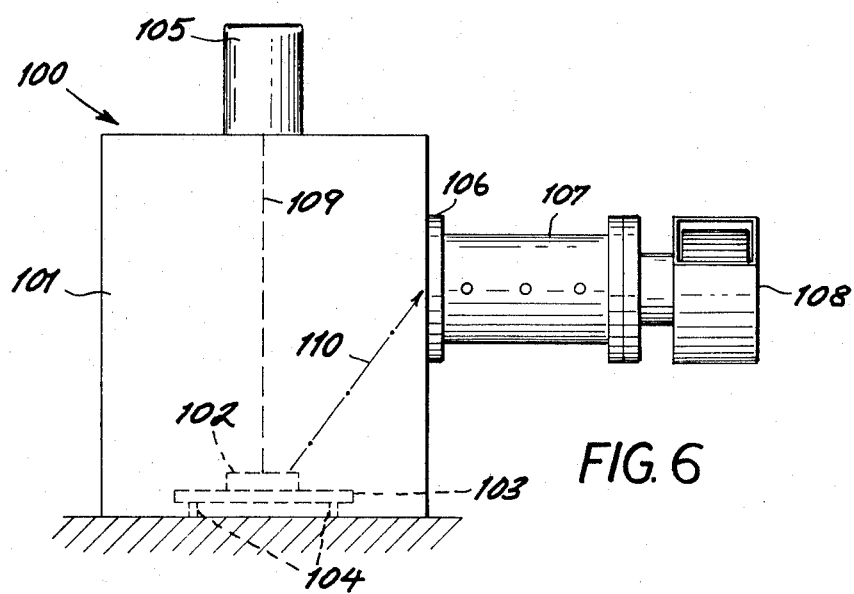
FIG. 6 is a diagram containing an overall view of the duct of FIG. 1 or FIG. 3 as used with an electron-beam chamber.

Referring first to FIG. 6, it should be noted that the present invention relates to an electron-beam welding apparatus 100 which may comprise an electron-beam chamber 101 having a door through which a workpiece 102 can be inserted into the chamber on a carriage 103 movable along rails 104. The electron gun 105 is here shown to be mounted at the top of the chamber, which is lined with lead or another material of a high capture cross section for X-ray radiation. The chamber 101 is provided with a port 106 to which a conduit 107 as represented in FIG. 1 or FIG. 3 is flanged. A high vacuum pump 108 is connected to the conduit 107 and is designed to reduce the pressure or evacuate the chamber 101 to $10^{-4}$ Torr. The chamber 101 and the electron gun 105 may be constituted as illustrated and described in the aforementioned application. The electron gun 105 directs an electron beam 109 represented in broken lines against the workpiece 102 to weld the latter. X-ray radiation produced upon impingement of the high-energy electron beam upon the workpiece may pass into the suction port as represented by the dot-dash arrow 110.

In FIG. 1, we show a suction duct 1 adapted to be used as represented at 107 in FIG. 6. The duct is, therefore, connected between the working chamber of an electron-beam welding apparatus and the vacuum pump arrangement to which the conduit can be connected by flanges 4 and 5. The outer shell of the duct is represented at 2 and constitutes a conventional metal such as steel, preferably stainless steel, adapted to provide the necessary structural strength and lined internally with a radiation blocking layer 3 of, for example, lead.

Figure 7:
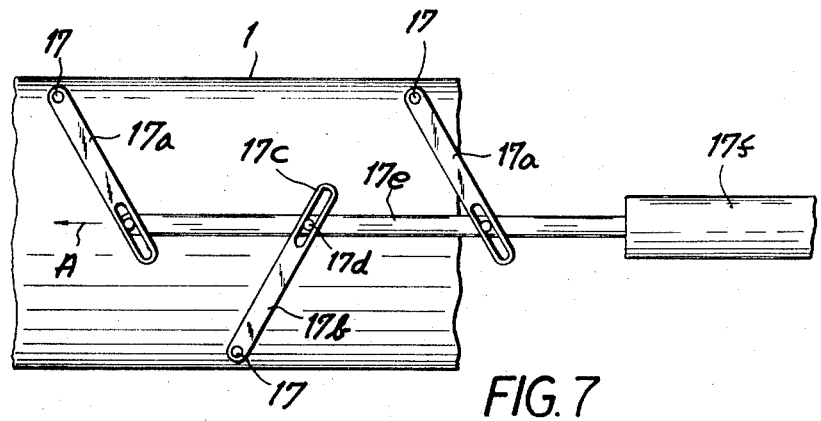
FIG. 7 is a view illustrating the manner in which the system of FIG. 1 is actuated.

Within the interior 6 of the duct 1, there are provided three shafts 7 which are journaled in the outer walls of the duct and may have stubs 17 (FIG. 2) projecting outwardly therefrom. As shown in FIG. 7, the stubs 17 lie alternately on opposite sides of the duct 1 and can be provided with lever 17a and 17b having bifurcated ends 17c slidably receiving pins 17d of an actuating rod 17e, the latter may be displaced to the left (arrow A) by a pneumatic cylinder 17. *The displacement of the connecting rod 17e to the left in FIG. 7* swings the shafts 7 in the clockwise sense where these shafts are provided along the top of the duct and the shaft 7 along the bottom of the duct in the counter-clockwise sense.

Figure 2:
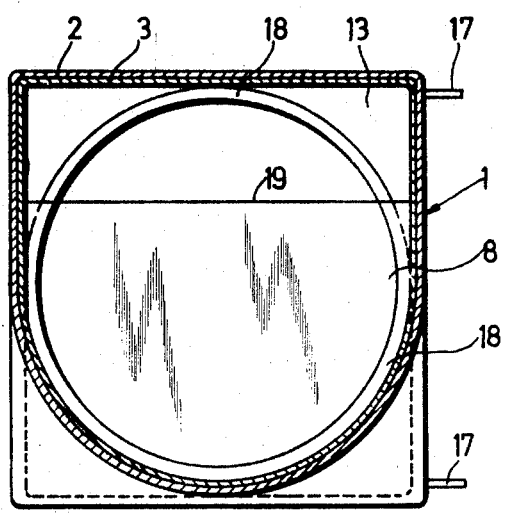
FIG. 2 is a cross-sectional view taken along the line II — II of FIG. 1.

As shown in FIGS. 1 and 2, the shafts 7 carry planar diaphragms, shutters or baffles 8 – 10 in axially spaced relation. Each of these baffles comprises a supporting plate 11 of steel, preferably stainless steel and a lead layer 12.

As will be apparent from FIG. 2, the baffles 8 – 10 are substantially rectangular with a lineral peripheral edge 19 spaced from the wall of the duct 1 opposite that at which each diaphragm is journaled. Furthermore, the baffle 8 extends outwardly beyond the edge 19 of the upwardly extending baffle 9 while the baffle 10 again extends downwardly in the X-ray shielding or erect position of the baffles. In this position, each of the baffles reaches across approximately five-sixth of the total cross section of the duct, leaving a space of one-sixth of this cross section through which evacuation continues to be effective. In order for X-ray radiation to traverse the duct with the baffles in their erect position, the X-ray radiation path must be bent angularly several times, which is not the customary manner in which X-rays travel, or several re-emissions or defractions must occur, each with loss of energy and danger. The vacuum during the welding operation may be maintained through the free clearances defined by the edges 19 since only minor linkage losses must be absorbed by the suction pump and little obstruction is provided by the shutters.

For each of the shutters 8 – 10, we provide square recesses 13, 14 and 15 adjacent the respective shafts 7, the recesses extending substantially half-way across the duct as indicated by the horizontal dot-dash line 16. The recesses are lined with a ledge or ridge 18 which is engaged by each of the shutters in its erect position and prevents stray radiation from passing between the periphery of any shutter and the wall of the duct. Members 18 are, of course, rigidly secured to the duct wall and form radiation-tight junctions therewith. When the shafts 7 of the shutters 8 and 10 are rotated in the counterclockwise sense by the actuating means illustrated in FIG. 7, and ths shutter 9 is swung in the clockwise sense, the shutters are received in the respective recesses as illustrated by broken lines in FIG. 1 and lie substantially flush with the walls of the duct. Air may pass unobstructedly through the duct for rapid evacuation of the chamber prior to welding.

Figure 4:
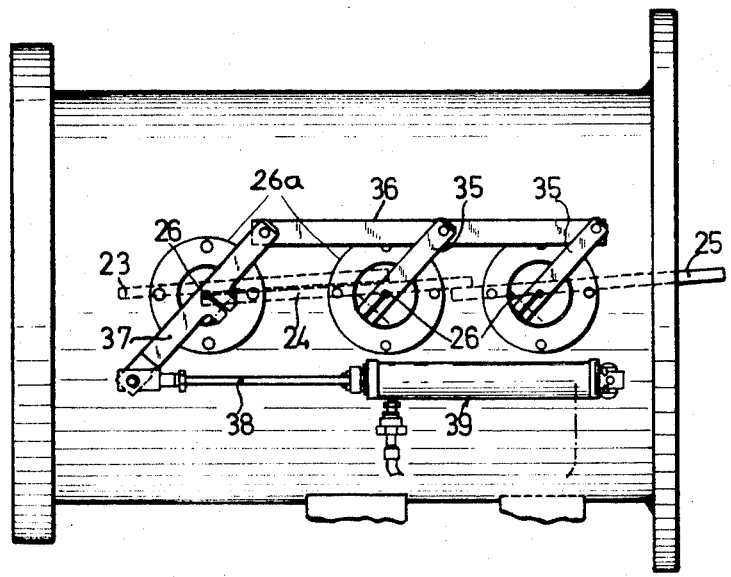
FIG. 4 is a side-elevational view of this duct showing the actuating means.
Figure 5:
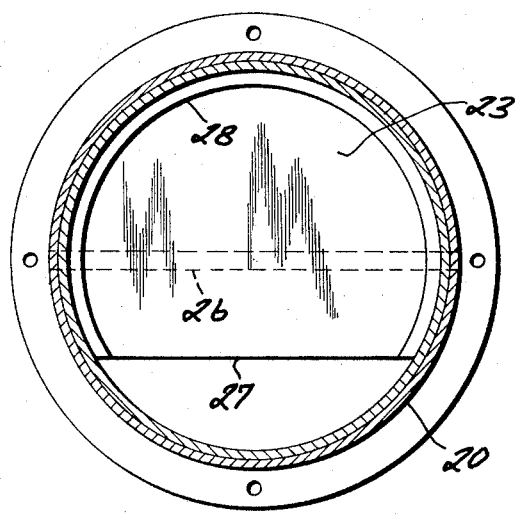
FIG. 5 is a cross-sectional view taken along the line V — V of FIG. 3.

In FIGS. 3–5, we have shown an embodiment of the duct 107 which s of simpler and less expensive construction. In this embodiment, the duct 20 is provided with flanges 21 and 22 similar to those of FIG. 1 for securing the duct to the electron-beam chamber and the suction pump assembly as previously described. The three shutters 23–25 mounted in this duct 20 are pivotal on the respective shafts 26 which are coplanar and are perpendicular to the axis of the duct while lying therealong. The shutters 23–25 are of circular-segmental shape, omitting a sector defined by the linear peripheral edge 27 which provides a gap, in the erected position of each shutter, of about one sixth the total cross section of the duct. The advantage of this system resides in its simple construction, since its effectiveness is similar to that of FIG. 1 in preventing the passage of radiation. As in the system of FIG. 1, rays 29 and 30 (illustrated by way of Example) may enter the duct. Upon impingement with the obstructed surface and the resultant defraction, rays 29a and 30a, which are the only rays not intercepted and absorbed, continue with energy attenuation to the next impingement with a lead-lined wall. The third order rays 29b and 30b are then produced and similarly generate rays 29c and 30c. The multiple collisions, of course, alllow the rays 30c and 29d to emerge, the latter ray being of the fifth order type. As a consequence, the rays are so attenuated as not to pose a danger to man.

The shafts 26 of the shutters 23 – 25 are provided with levers 35, 36 and 37 on the shaft ends emerging through respective seals as represented diagrammatically at 26a. Lever 36 is extended to form an arm 37 coupled to the piston rod 38 of an actuating cylinder 39 which is automatically operated upon evacuation of the electron-beam chamber to prevent inadvertent failure of the shutter system to operate.

In the system of FIG. 1, the distance D between the erect shutters in the axial direction is less than or equal to the transverse height H of each shutter while, in FIG. 3, the transverse distance $d$ is equal to or less than the maximum radial dimension $h$ of the shutter to ensure substantially overlapping relationship in the prone positions.

We claim:

1. A method of operating an evacuatable chamber adapted to produce radiation and having evacuation duct means connecting the chamber to suction-source means, said method comprising the steps of interposing radiation blocking surfaces at spaced-apart locations in said duct and on alternate sides thereof into the path of radiation traversing said duct during radiation-producing procedures in said chamber, said surfaces interposed into said path being in overlapping arrangement in an erect position for continuing evacuation of said chamber through said duct means; and shifting said surfaces out of said path for rapid evacuation of said chamber through said duct means.

2. A method of operating an evacuatable chamber adapted to produce radiation and having a duct connecting the chamber to a suction source, said method comprising the steps of interposing radiation blocking surfaces at spaced-apart locations in said duct into the path of radiation traversing same during radiation-producing procedures in said chamber; and shifting said surfaces out of said path for rapid evacuation of said chamber through said duct, said surfaces being swingable shutters on alternate sides of said duct partly obstructing said duct in an erect position and having a recumbent position permitting evacuation of said duct, the ends of said blocking surfaces being in overlapping relationship when said shutters are in said erect position, said method further comprising the steps of:

rapidly evacuating said chamber through said duct upon displacement of said shutters into a recumbent position, swinging said shutters into said erect position, effecting electron-beam welding in said chamber with said shutters in said erect position, and continuing to evacuate said chamber through said duct with said shutters in said erect position during electron-beam welding in said chamber.

3. An electron-beam apparatus comprising an evacuatable chamber, a suction source connected to said chamber, a duct connecting said chamber with said suction source, and radiation-blocking means in said duct, said radiation blocking means comprising a plurality of shutters spaced along said duct, pivot means for mounting said shutters for movement between a recumbent position wherein said shutters lie generally parallel to a wall of said duct and an erect position wherein said shutters lie transversely to said duct, said shutters extending alternately from opposite sides of said duct toward the interior thereof with alternate shutters being in overlapping relationship at the interior of the duct, and actuating means for displacing said shutters between said positions.

4. An electron-beam apparatus comprising an evacuatable chamber, a suction sources connected to said chamber, a duct connecting said chamber with said suction source, and radiation-blocking means in said duct, said radiation blocking means comprising a plurality of shutters spaced along said duct, pivot means for mounting said shutters for movement between a recumbent position wherein said shutters lie generally parallel to a wall of said duct and an erect position wherein said shutters lie transversely to said duct, said shutters extending alternately from opposite sides of said duct toward the interior thereof in said erect position with the alternate shutters being in overlapping relationship, and actuating means for displacing said shutters between said positions, at least three such shutters being provided and said shutters being generally planar and each extending over a major portion of the cross-section of said duct in said erect position but defines a free space of a minor fraction of the duct cross-section in said erect position.

5. The apparatus defined in claim 4 wherein said shutters are each pivotally mounted for swinging movement about an axis extending parallel to the plane of the respective shutter and perpendicular to the axis of the duct, the shutter axes being parallel to one another.

6. The apparatus defined in claim 5 wherein said shutter axes are disposed along an edge of each shutter, said duct being formed with a respective recess receiving each of said shutters in the recumbent position thereof.

7. The apparatus defined in claim 5 wherein said shutter axes are provided at an intermediate portion of each shutter and all of said shutter axes are coplanar and lie in a plane of the axis of said duct.

8. The apparatus defined in claim 5, further comprising a respective ledge formed along the wall of said duct in the region of each of said shutters and constituting a peripheral abutment therefor in the erect position of the shutter.

9. The apparatus defined in claim 5, further comprising a pivot shaft journaled in the wall of said duct and carrying the respective shutter, said shafts extending outwardly from said duct, and actuating means externally of said duct and connected to said shafts for displacing said shutters.

10. The apparatus defined in claim 9 wherein said actuating means includes a respective lever connected to each of said shafts and link means interconnecting said levers for joint displacement.

* * * * *